US010394192B2

(12) United States Patent
Ji

(10) Patent No.: US 10,394,192 B2
(45) Date of Patent: Aug. 27, 2019

(54) SMART WATCH, OPERATION CONTROL METHOD AND APPARATUS THEREFOR

(71) Applicant: BOE TECHNOLOGY GROUP CO., LTD., Beijing (CN)

(72) Inventor: Chunyan Ji, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 52 days.

(21) Appl. No.: 15/325,024

(22) PCT Filed: Feb. 3, 2016

(86) PCT No.: PCT/CN2016/073299
§ 371 (c)(1),
(2) Date: Jan. 9, 2017

(87) PCT Pub. No.: WO2017/049836
PCT Pub. Date: Mar. 30, 2017

(65) Prior Publication Data
US 2017/0293266 A1 Oct. 12, 2017

(30) Foreign Application Priority Data

Sep. 21, 2015 (CN) .......................... 2015 1 0604183

(51) Int. Cl.
G06F 1/16 (2006.01)
G04G 17/08 (2006.01)
(Continued)

(52) U.S. Cl.
CPC ........... *G04G 17/08* (2013.01); *G04G 21/025* (2013.01); *G06F 1/163* (2013.01); *G06F 1/169* (2013.01);
(Continued)

(58) Field of Classification Search
CPC ........ G04B 47/06; G04G 21/00; G04G 21/02; G04G 21/025; G04G 17/08; G06F 3/03547
See application file for complete search history.

(56) References Cited

U.S. PATENT DOCUMENTS

2001/0043514 A1 11/2001 Kita
2015/0049591 A1* 2/2015 Adams ................... G04G 21/08
368/13
(Continued)

FOREIGN PATENT DOCUMENTS

CN 1324030 A 11/2001
CN 203219381 U 9/2013
(Continued)

OTHER PUBLICATIONS

Hussain, Faisal, "How to Unlock Your Fingerprint-Protected Galaxy S5 Using Only One Hand", published on Apr. 18, 2014, Gadget Hacks, retrieved on Nov. 24, 2018 from https://gs5.gadgethacks.com/how-to/unlock-your-fingerprint-protected-galaxy-s5-using-only-one-hand-0154479/ full document (Year: 2014).*
(Continued)

Primary Examiner — Daniel P Wicklund
(74) Attorney, Agent, or Firm — Harness, Dickey & Pierce, P.L.C.

(57) ABSTRACT

A smart watch, an operation control method and an apparatus therefor are disclosed. The smart watch includes a watch body and a watchband, wherein the watch body includes a display screen and a system board, and the system board includes at least a microprocessor, a memory and a communication module. The watchband is configured to fix the watch body on a user's wrist. A biosensor is integrated on the surface of the wristband on a side adjacent to the user's wrist. As the watchband can contact directly with wrist side nerves, more accurate test results can be obtained, (Continued)

and operational complexity is simplified. By canceling the bezel design and performing a corresponding operation according to a touch operation detected in a functional region, a size of the smart watch is reduced and comfort and flexibility while wearing the smart watch is improved.

17 Claims, 4 Drawing Sheets

(51) Int. Cl.
  *G04G 21/02* (2010.01)
  *G06F 3/0354* (2013.01)
(52) U.S. Cl.
  CPC .. *G06F 3/03547* (2013.01); *G06F 2203/0338* (2013.01); *G06F 2203/0339* (2013.01)

(56) References Cited

U.S. PATENT DOCUMENTS

| | | | | |
|---|---|---|---|---|
| 2015/0054764 | A1 | 2/2015 | Kim et al. | |
| 2015/0111558 | A1* | 4/2015 | Yang | G04G 21/04 |
| | | | | 455/418 |
| 2015/0186092 | A1* | 7/2015 | Francis | G06F 3/1423 |
| | | | | 345/520 |
| 2015/0186705 | A1* | 7/2015 | Magi | G06K 9/0002 |
| | | | | 382/125 |
| 2015/0265214 | A1* | 9/2015 | De Kok | A61B 5/6843 |
| | | | | 600/301 |
| 2015/0338979 | A1* | 11/2015 | Rhee | G06F 3/0414 |
| | | | | 345/174 |
| 2015/0363065 | A1* | 12/2015 | Kim | G06F 3/0482 |
| | | | | 715/739 |
| 2016/0026308 | A1* | 1/2016 | Wu | G06F 3/04883 |
| | | | | 345/173 |
| 2016/0062534 | A1 | 3/2016 | Yang | |
| 2016/0239142 | A1* | 8/2016 | Lim | G06F 3/0416 |
| 2017/0176950 | A1* | 6/2017 | Jung | G04B 19/225 |
| 2017/0208160 | A1* | 7/2017 | Kim | H04M 1/0266 |
| 2017/0371431 | A1* | 12/2017 | Kim | G06F 3/0317 |
| 2018/0039233 | A1* | 2/2018 | Shim | G04G 21/08 |

FOREIGN PATENT DOCUMENTS

| | | |
|---|---|---|
| CN | 203299558 U | 11/2013 |
| CN | 103558918 A | 2/2014 |
| CN | 103838992 A | 6/2014 |
| CN | 104199602 A | 12/2014 |
| CN | 104352223 A | 2/2015 |
| CN | 204166294 U | 2/2015 |
| CN | 204302672 U | 4/2015 |
| CN | 104777987 A | 7/2015 |
| CN | 204631452 U | 9/2015 |
| CN | 105093913 A | 11/2015 |
| CN | 204925648 U | 12/2015 |
| JP | 2008073461 A | 4/2008 |

OTHER PUBLICATIONS

Written Opinion of the International Searching Authority from PCT Application No. PCT/CN2016/073299, dated Jun. 22, 2016 (6 pages).

Office Action from corresponding Chinese Application No. 201510604183.2, dated Mar. 3, 2017 (6 pages).

Office Action from Chinese Application No. 201510604183.2 dated Feb. 6, 2018 (7 pages).

* cited by examiner

SMART WATCH, OPERATION CONTROL METHOD AND APPARATUS THEREFOR

TECHNICAL FIELD

Embodiments of the disclosure relate to the technical field of terminals, in particular to a smart watch, an operation control method and an apparatus therefor.

BACKGROUND

With the development of terminal technology, wearable devices gradually come into users' life with advantages such as portability, low-cost, etc. Taking a smart watch among wearable devices as an example, the smart watch not only has the basic functions of a watch, being able to display the current time, but also has the function of connection, which is that by connecting with a smart terminal, it can display the information pushed by the smart terminal, while it can also monitor the user's various physiological parameters.

As shown in FIG. 1, presently, most smart watches available in the market consist of a watch body 101, a watchband 102, and a watch bezel 103 surrounding the watch body. The watch body 101 has a display screen for displaying the current time and the information pushed by a smart terminal. The display screen on the watch body may generally be large in order to facilitate the user viewing and touching the displayed contents on the display screen. The bottom of the watch body 101 is installed with a plurality of sensors having health monitoring functions, such as a heart rate sensor etc. When the user wants to know the heart rate condition, he needs to move the watch body from the back of the arm to the wrist position where nerves are abundant. The watch bezel 103 is provided with a plurality of buttons, such as those of power source, back etc. By touching these buttons, the user can control operations such as turning on, turning off the smart watch, etc.

In general, after the smart watch and a smart terminal establish a connection through Bluetooth, WiFi (Wireless Fidelity) etc., the smart watch may display in real time the message pushed by the smart terminal on the display screen.

The inventors have found that the prior art has at least the following problems:

The smart watch used currently is provided with a bezel, resulting in low comfort, poor flexibility during wearing; and when performing heart rate monitoring, the user is required to turn the watch body to the wrist position and thus the detecting process is relatively complicated.

SUMMARY

In order to solve the problems of the related art, embodiments of the present disclosure provide a smart watch, an operation control method and an apparatus therefor. The technical solution is as follows:

In a first aspect, there is provided a smart watch comprising: a watch body and a watchband;

wherein the watch body comprises a display screen and a system board, the system board comprising at least a microprocessor, a memory and a communication module;

the watchband is configured to fix the watch body on a user's wrist, and a biosensor is integrated on the surface of the watchband on the side adjacent to the user's wrist.

According to an exemplary embodiment of the present disclosure, the watch body further comprises a plurality of sensors, which includes at least a gravitational accelerometer and a gyroscope.

According to an exemplary embodiment of the present disclosure, the display screen includes at least one of a LCD (liquid crystal display), an OLED (organic light-emitting diode), an E-ink (electronic ink).

According to an exemplary embodiment of the present disclosure, the system board further comprises a power management module.

According to an exemplary embodiment of the present disclosure, the smart wristwatch further comprises a metal ring disposed around the watch body and protruding above an upper surface of the watch body, and the metal ring is configured to fix and protect the watch body.

According to an exemplary embodiment of the present disclosure, the outer wall of the metal ring is provided with two functional regions.

According to an exemplary embodiment of the present disclosure, the two functional regions are concave from the surface of the metal ring.

According to an exemplary embodiment of the present disclosure, each functional region includes a fingerprint identification sensor and a fingerprint identification module;

the fingerprint sensor is disposed on the surface of the corresponding functional region, and the fingerprint identification module is disposed inside the corresponding functional region.

According to an exemplary embodiment of the present disclosure, each functional region further includes an energy storage module.

According to an exemplary embodiment of the present disclosure, the communication module comprises one of a Bluetooth module, a Wireless Fidelity (WiFi) module, an infrared module, and a near field communication (NFC) module.

According to an exemplary embodiment of the present disclosure, the watch body is electrically connected with the watch band.

In a second aspect, there is provided an operation control method for a smart watch, the method comprises:

when a sliding operation is detected on any functional region, acquiring sliding information of the sliding operation, the sliding information comprises at least first fingerprint information and a sliding direction;

matching the first fingerprint information with pre-stored fingerprint information;

if the first fingerprint information matches the pre-stored fingerprint information, acquiring a current state of the smart watch, the state including a power-on state, a standby state and a power-off state;

performing a corresponding operation according to the current state and the sliding direction.

According to the exemplary embodiment of the disclosure, the method further comprises:

if the first fingerprint information does not match the pre-stored fingerprint information, continuing with the step of acquiring the sliding information of the sliding operation.

According to an exemplary embodiment of the present disclosure, the performing a corresponding operation according to the current state and the sliding direction comprises:

performing a power-off operation if the current state is the power-on state and the sliding direction is a first direction;

performing a power-on operation if the current state is the power-off state and the sliding direction is a second direction.

According to an exemplary embodiment of the disclosure, the method further comprises:

receiving a message pushed by a smart terminal;

when a touch operation is acquired on any functional region, acquiring second fingerprint information of the touch operation;

matching the second fingerprint information with the pre-stored fingerprint information;

if the second fingerprint information matches the pre-stored fingerprint information, displaying the contents of the message on a display screen.

According to an exemplary embodiment of the present disclosure, prior to receiving the message pushed by the smart terminal, the method further comprises:

establishing a connection with the smart terminal.

According to an exemplary embodiment of the disclosure, the method further comprises:

if a touch operation is not detected or information pushed by a smart terminal is not received within a preset time period in the power-on state, switching the current state from the power-on state to the standby state and displaying the current time on a display screen.

According to an exemplary embodiment of the present disclosure, after switching the current state from the power-on state to the standby state, the method further comprises:

switching the current state from the standby state to the power-on state when a touch operation is detected on the display.

According to an exemplary embodiment of the present disclosure, the method is applied to the above-described smart watch.

In a third aspect, there is provided an operation control apparatus for a smart watch, the apparatus comprises:

a first acquiring module configured to, when a sliding operation is detected on any functional region, acquire sliding information of the sliding operation, the sliding information comprising at least first fingerprint information and a sliding direction;

a first matching module configured to match the first fingerprint information with a pre-stored fingerprint information;

a second acquiring module configured to acquire a current state of the smart watch if the first fingerprint information matches the pre-stored fingerprint information, the state including a power-on state, a standby state and a power-off state;

an operation performing module configured to perform a corresponding operation according to the current state and the sliding direction.

According to an exemplary embodiment of the present disclosure, the first acquiring module is configured to continue to acquire sliding information of the sliding operation when the first fingerprint information does not match the pre-stored fingerprint information.

According to an exemplary embodiment of the present disclosure, the operation performing module is configured to perform a power-off operation when the current state is the power-on state and the sliding direction is a first direction, and to perform a power-on operation when the current state is the power-off state, and the sliding direction is a second direction.

According to an exemplary embodiment of the present disclosure, the apparatus further comprises:

a receiving module configured to receive a message pushed by a smart terminal;

a third acquiring module configured to, when a touch operation is acquired on any functional region, acquire a second fingerprint information of the touch operation;

a second matching module configured to match the second fingerprint information with the pre-stored fingerprint information;

a first display module configured to display the contents of the message on a display screen if the second fingerprint information matches the pre-stored fingerprint information.

According to an exemplary embodiment of the present disclosure, the apparatus further comprises:

a connection module configured to establish a connection with the smart terminal.

According to an exemplary embodiment of the present disclosure, the apparatus further comprises:

a first switching module configured to switch the current state from the power-on state to the standby state if a touch operation is not detected or information pushed by a smart terminal is not received within a preset time period in the power-on state;

a second display module configured to display the current time on the display screen.

According to an exemplary embodiment of the present disclosure, the apparatus further comprises:

a second switching module configured to switch the current state from the standby state to the power-on state when a touch operation is detected on the display screen.

The technical solution provided by embodiments of the disclosure has beneficial effects as follows:

As the watchband can directly contact the wrist side nerves, more accurate test results can be obtained by integrating a biosensor having a health monitoring function on the surface of the watchband on the side adjacent to the user's wrist, without need of turning the watch body, thus reducing the operation complexity. In addition, in an exemplary embodiment of the present disclosure, as the bezel design is canceled, and a corresponding operation is performed according to a touch operation detected on the functional region, thus reducing the size of the smart watch, and improving the comfort and flexibility during wearing.

BRIEF DESCRIPTION OF THE DRAWINGS

In order to more clearly illustrate the technical solutions of embodiments of the present disclosure, the drawings which are required to be used in the description of the embodiments will be briefly described below. It is obvious that the drawings described below are only some embodiments of the present disclosure. It will be apparent to those ordinary people skilled in the art that other drawings may be obtained based on the accompanying drawings without inventive effort.

DETAILED DESCRIPTION OF SPECIFIC EMBODIMENTS

To make the purpose, technical solutions and advantages of the present disclosure clearer, the implementations of the present disclosure will be described in detail in conjunction with drawings.

Figure 1:
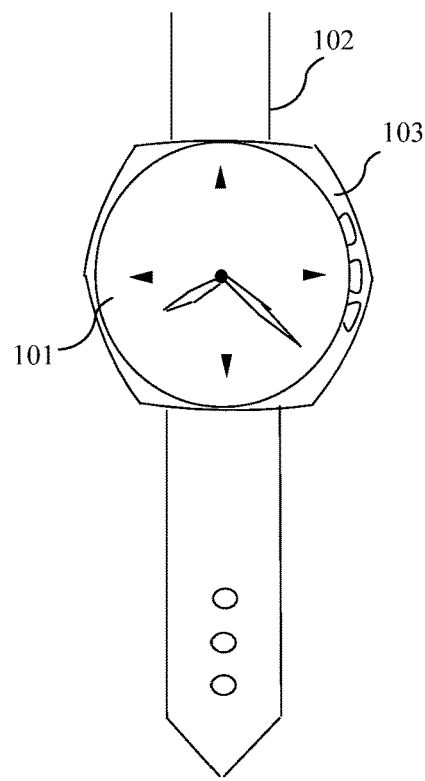
FIG. 1 is a structural schematic view of an existing smart watch.
Figure 2:
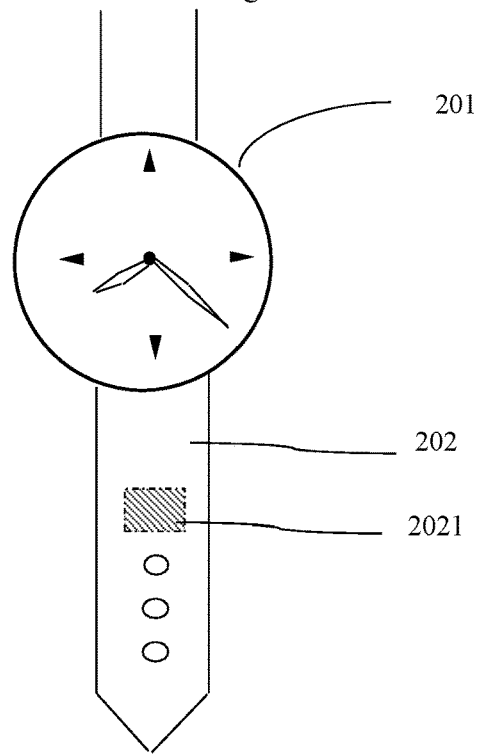
FIG. 2 is a structural schematic view of the smart watch according to an embodiment of the present disclosure.

In order to solve the problem of complexity for an existing smart watch to monitor the user's physiological parameters, embodiments of the present disclosure provide a smart watch comprising a watch body 201 and a watchband 202, as shown in FIG. 2.

In an embodiment of the present disclosure, the watch body 201 comprises at least a display screen and a system board. Therein the display screen is configured to display the present time and messages pushed by a connected smart terminal. The system board comprises at least a microprocessor, a memory, a communication module, etc., and is configured to control the operation of the smart watch. Optionally, the watch body 201 further comprises a touch module for detecting a touch operation on the display screen.

In an embodiment of the present disclosure, the watchband 202 is configured to fix the watch body 201 to the wrist of the user, and a biosensor 2021, which is a flexible sensor, is integrated on the surface of the band 202 on the side adjacent to the wrist of the user. In addition, the biosensor 2021 may be a sensor incorporating a plurality of physiological monitoring functions and be capable of detecting a variety of physiological parameters of a user; the biosensor 2021 may also be a plurality of separate sensors having physiological monitoring functions, and each sensor can monitor a physiological parameter of the user.

According to the smart watch provided by embodiments of the present disclosure, since the watchband can directly contact wrist side nerves, more accurate test results can be acquired by integrating a biosensor having a health monitoring function on the surface of the wristband on the side adjacent to the wrist of the user without need to turn the watch body, thus simplifying the operation complexity.

As shown in FIG. 2, an embodiment of the present disclosure provides a smart watch comprising a watch body 201 and a watchband 202.

The watch body 201 also comprises a plurality of sensors including at least a gravitational accelerometer, a gyroscope, etc. Therein, the gravity accelerometer is configured to detect the change of the gravity acceleration of the smart watch, and send a close command to the system board when the change of the gravitational acceleration of the smart watch is detected, to control the function modules in the control system board to stop operation, so that the damage caused by the impact can be effectively reduced when the smart watch falls. The gyroscope is configured to detect the user's hand displacement, and perform GPS (Global Positioning System) navigation and so on.

In another embodiment of the present disclosure, the display screen on the watch body includes at least one of an LCD, an OLED, and an E-ink.

In order to better drive various functional modules in the smart watch to operate, the smart watch system further comprises a power management module for supplying power to the smart watch. The power management module consists of a storage capacitor and a rechargeable battery. In most cases, the power is supplied to the smart watch by the rechargeable battery. When the rechargeable battery power is low, the storage capacitor may urgently supply power to the smart watch.

Figure 3:
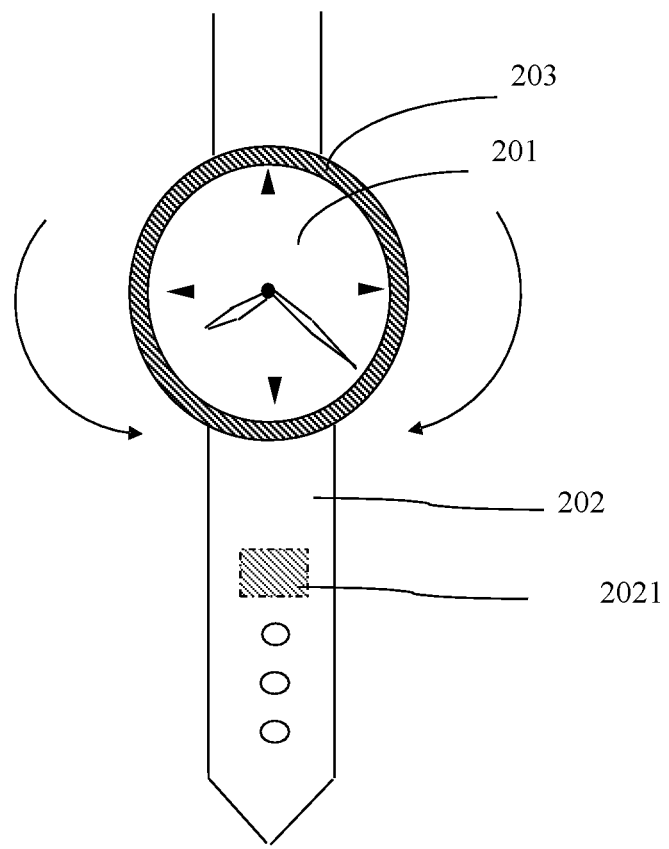
FIG. 3 is a structural schematic view of the smart watch according to another embodiment of the present disclosure.

Referring to FIG. 3, the smart watch further comprises a metal ring 203 for fixing and protecting the watch body 201. The metal ring 203 is provided around the watch body 201 and protrudes above the upper surface of the watch body 201 to prevent the display screen from being broken due to direct contact with the ground when the smart watch is dropped.

Figure 4:
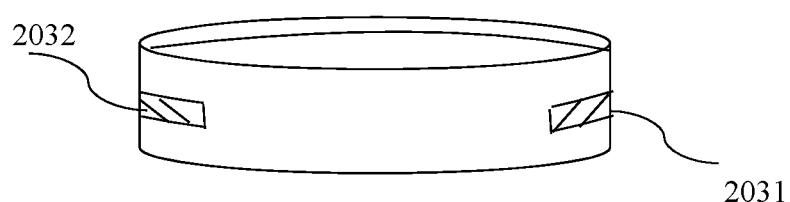
FIG. 4 is a structural schematic view of the metal ring according to another embodiment of the present disclosure.

Referring to FIG. 4, the outer wall of the metal ring 203 is provided with two functional regions, a first functional region 2031 and a second functional region 2032, respectively. By touching any of the functional regions, the functional region can be activated to be in a working state. Optionally, based on a consideration of the appearance design of the smart watch, and in order to facilitate the user quickly locating a functional region, the two functional regions may be concave from the surface of the metal ring.

In another embodiment of the present disclosure, each of the functional regions further comprises a fingerprint identification sensor and a fingerprint identification module. Therein the fingerprint identification sensor is disposed on the surface of the corresponding functional region for detecting a touch operation on the corresponding functional region; the fingerprint identification module is disposed inside the corresponding functional region for acquiring the fingerprint information and identifying the acquired fingerprint information when the fingerprint sensor has detected the touch operation on the corresponding functional region.

In another embodiment of the disclosure, each of the functional regions further comprises an energy storage module for, when a sliding operation is detected on a corresponding functional region by any of the fingerprint identification modules, collecting the heat generated during the sliding process and converting the collected heat into electrical energy to be stored in the storage capacitor in the power management module.

In another embodiment of the present disclosure, the communication module comprises one of a Bluetooth module, a wireless fidelity (WiFi) module, an infrared module and a near field communication (NFC) module. The present embodiment does not limit the type of the communication module. Through the communication module, the smart watch can be connected with a smart phone, and can also access the Internet.

In another embodiment of the present disclosure, the watch body 201 is electrically connected with the watchband 202.

According to the smart watch provided in embodiments of the present disclosure, since the watchband can contact directly wrist side nerves, more accurate test results can be acquired by integrating a biosensor having a health monitoring function on the surface of the wristband on the side adjacent to the wrist of the user without need to turn the watch body, which simplifies the operation complexity. At the same time, the bezel design is canceled, thus reducing the size of the smart watch and improving the comfort and flexibility during wearing.

All of the above alternative solutions can be combined in any way to form alternative embodiments of the present disclosure, which will not be described in detail herein.

Figure 5:
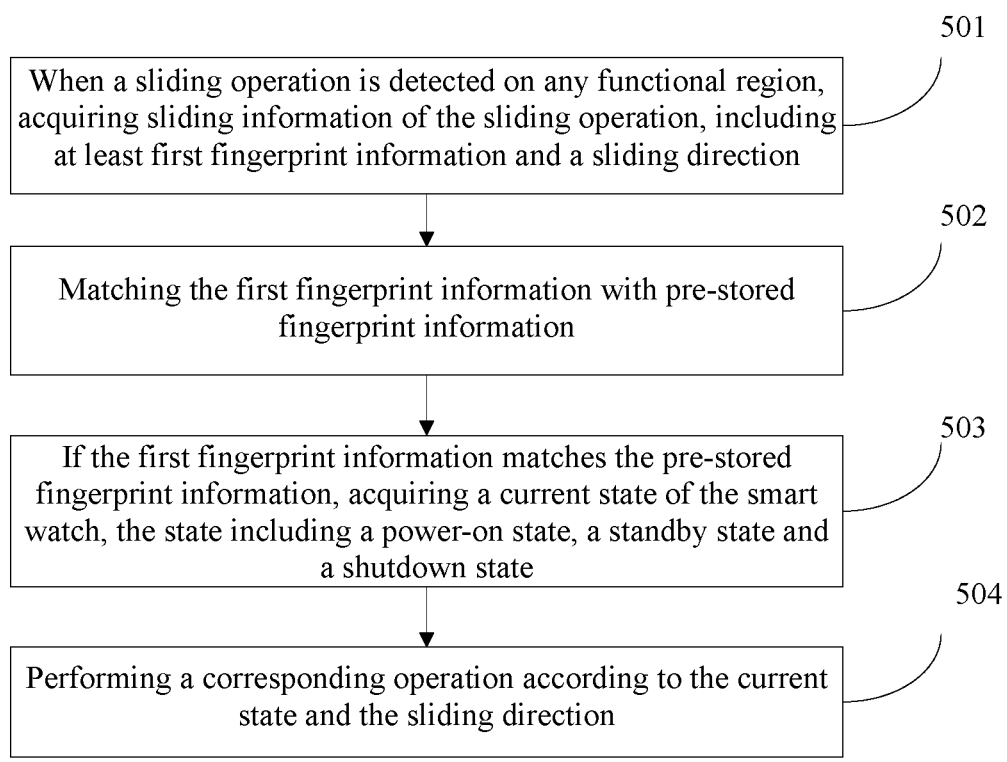
FIG. 5 is a flow chart of the operation control method provided by another embodiment of the present disclosure.

An embodiment of the present disclosure provides an operation control method applied to the above-described smart watch shown in FIGS. 2 to 4. With the smart watch executing this embodiment as an example, referring to FIG. 5, the present embodiment provides an operation control method, comprising the following steps:

501, when a sliding operation is detected on functional region, acquiring sliding information of the sliding operation, the sliding information including at least first fingerprint information and a sliding direction.

502, matching the first fingerprint information with pre-stored fingerprint information;

503, if the first fingerprint information matches the pre-stored fingerprint information, acquiring a current state of the smart watch, the state including a power-on state, a standby state and a power-off state.

504, performing a corresponding operation according to the current state and the sliding direction.

The method provided by embodiments of the disclosure, in the situation that the bezel design is canceled, performs a corresponding operation according to a touch operation detected on a functional region, thus reducing the size of the smart watch and improving the comfort and flexibility during wearing.

In another embodiment of the present disclosure, after matching the fingerprint information with the pre-stored fingerprint information, the method further comprises:

if the first fingerprint information does not match with the pre-stored fingerprint information, continuing with the step of acquiring the sliding information of the sliding operation.

In another embodiment of the present disclosure, the performing a corresponding operation according to the current state and the sliding direction comprises:

performing a power-off operation if the current state is the power-on state and the sliding direction is a first direction;

performing a power-on operation if the current state is the power-off state and the sliding direction is a second direction.

In another embodiment of the present disclosure, the method further comprises:

receiving a message pushed by a smart terminal;

when a touch operation is acquired on any functional region, acquiring a second fingerprint information of the touch operation;

matching the second fingerprint information with the pre-stored fingerprint information;

if the second fingerprint information matches the pre-stored fingerprint information, displaying the contents of the message on the display screen.

In another embodiment of the present disclosure, prior to receiving the message pushed by the smart terminal, the method further comprises:

establishing a connection with the smart terminal.

In another embodiment of the present disclosure, the method further comprises:

switching the current state from the power-on state to the standby state and displaying the current time on a display screen if a touch operation is not detected or information pushed by the smart terminal is not received within a preset time period in the power-on state.

In another embodiment of the present disclosure, after switching the current state from the power-on state to the stand-by state, the method further comprises:

when a touch operation is detected on the display, switching the current state from the standby state to the power-on state.

All the above alternative solutions may be combined in any way to form alternative embodiments of the present disclosure, which will not be described in detail herein.

Figure 6:
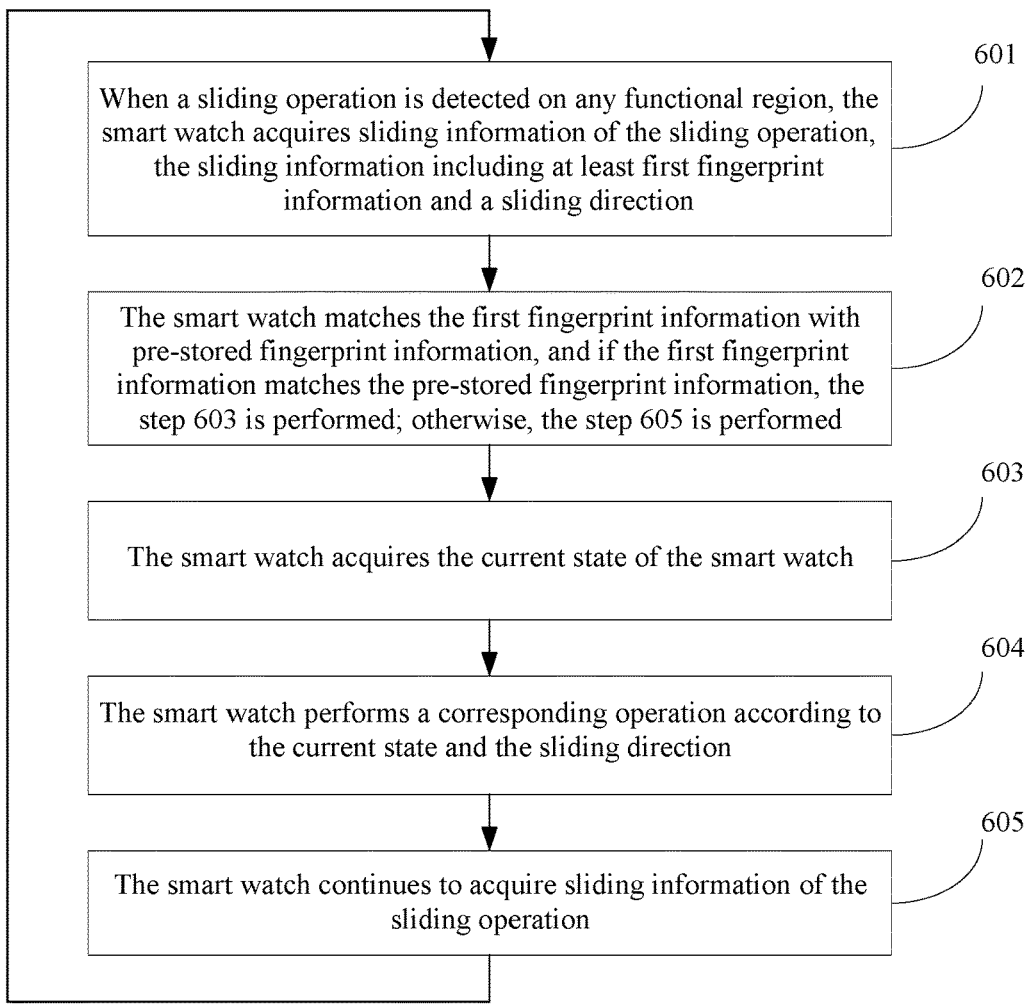
FIG. 6 is a flow chart of the operation control method provided by another embodiment of the present disclosure.

An embodiment of the present disclosure provides an operation control method applied to the above-described smart watch shown in FIGS. 2 to 4. With the smart watch executing this embodiment as an example, referring to FIG. 6, the present embodiment provides an operation control method, comprising the following steps:

601, when a sliding operation is detected on any functional region, the smart watch acquires sliding information of sliding operation, the sliding information comprising at least first fingerprint information and a sliding direction.

Therein, the sliding information comprises at least first fingerprint information, a sliding direction, etc. In the present embodiment, the fingerprint information is usually in the form of a fingerprint image, and the sliding direction may be a first direction, a second direction, etc. The present embodiment will be explained in an example where the first direction is a clockwise direction and second direction is an anticlockwise direction, respectively.

The method for acquiring the sliding information of a sliding operation of the smart watch includes, but not limited to: when the fingerprint identification sensor on any functional region of the smart watch detects a sliding operation on the surface of a functional region, the fingerprint identification module collects fingerprint information of the user's finger and acquires a start position and an end position of the sliding operation, and determines a sliding direction based on the start position and the end position.

602, the smart watch matches the first fingerprint information with pre-stored fingerprint information, and if the first fingerprint information matches the pre-stored fingerprint information, the step 603 is performed; otherwise, the step 605 is performed.

In order to improve the information security of the user and prevent other users from operating the smart watch to obtain the user information stored in the smart watch, the method provided by the embodiment further stores the fingerprint information of the user in advance, and the pre-stored fingerprint information may be the fingerprint information of a specified finger of the user's ten fingers, or may be the fingerprint information of the ten fingers.

Based on the pre-stored fingerprint information, when acquiring the first fingerprint, the smart watch can match the first fingerprint information with the pre-stored fingerprint information, and specifically, it can match a fingerprint image corresponding to the first fingerprint information with a fingerprint image corresponding to the pre-stored fingerprint information. If the similarity between the fingerprint image corresponding to the first fingerprint information and the fingerprint image corresponding to the pre-stored fingerprint information is greater than or equal to a preset threshold, it is determined that the first fingerprint information matches the pre-stored fingerprint information, and the following step 603 is executed. If the similarity between the fingerprint image corresponding to the first fingerprint information and the fingerprint image corresponding to the pre-stored fingerprint information is smaller than the preset threshold value, then it is determined that the first fingerprint information does not match the pre-stored fingerprint information, and the following step 605 is executed. Here, the preset threshold may be 60%, 70%, 80%, etc., and the present embodiment does not specifically limit the preset threshold.

603, the smart watch acquires the current state of the smart watch.

Therein, the states of the smart watch include a power-on state, a standby state and a power-off state. The CPU (central processing unit) occupancy, CPU temperature and other parameters of the smart watch in different states are different.

Based on the above contents, in order to acquire the current state of the smart watch, the smart watch may acquire the CPU occupancy, the CPU temperature and other parameters of the smart watch, and then according to the parameters acquired, it may determine the current state of the smart watch. Taking using the CPU occupancy to determine the current state of the smart watch as an example, and setting the CPU occupancy in the power-on state higher than 80%, the CPU occupancy in the standby state less than 40%, the CPU occupancy in the power-off state as 0%, if the acquired CPU occupancy of the smart watch is 85%, the current state of the smart watch can be determined as the power-on state; if the acquired CPU occupancy of the smart watch is 23%, the current state of the smart watch can be determined as the standby state; and if the acquired CPU occupancy of the smart watch is 0%, the current state of the smart watch can be determined as the power-off state.

604, the smart watch performs a corresponding operation according to the current state and the sliding direction.

The smart watch may perform the corresponding operation according to the current state and the sliding direction in various modes, including but not limited to the following two modes:

the first mode: if the current state is the power-on state and the sliding direction is a first direction, the power-off operation is performed.

the second mode: if the current state is the power-off state and the sliding direction is a second direction, the power-on operation is performed.

In another embodiment of the present disclosure, in order to better protect the privacy of the user, when the smart watch is in the power-on state, if a touch operation is not detected or information pushed by a smart terminal is not received within a preset time period, the smart watch will switch the current state from the power-on to the standby state and display the current time on the display screen.

After the smart watch switches the current state from the power-on state to the standby state, the method provided by the embodiment of the disclosure further supports switching the smart watch from the standby state to the power-on state. In the specific implementation, a touch operation may be detected on the display screen of the smart watch. If a touch operation is detected on the display screen, the smart watch may switch the current state from the standby state to the power-on state, as triggered by the touch operation. Of course, the smart watch may also switch the current state from the standby state to the power-on state by detecting other operations, which will not be described further in the present embodiment.

In addition, after the smart watch establishes a connection with a smart phone through the communication module, the smart watch may also receive a message pushed by the smart phone, and prompt the user through vibration, playing a specified audio file, etc. At this time, the specific content of the message is not yet displayed on the display screen of the smart watch, and the displaying needs to be triggered by the following operations, specifically as follows:

In a first step, the smart watch detects whether or not a touch operation has occurred on a functional region on either side of the metal ring.

As to the method for detecting whether a touch operation occurs on a functional region on either sides of the metal ring, the detection can be performed by a fingerprint identification sensor on either functional region.

In a second step, when a touch operation is acquired on any functional region, the smart watch acquires a second fingerprint information of the touch operation.

In a third step, the smart watch matches the second fingerprint information with the pre-stored fingerprint information.

In a fourth step, if the second fingerprint information matches the pre-stored fingerprint information, the smart watch displays the contents of the message on the display screen.

605, the smart watch continues to acquire sliding information of the sliding operation.

When detecting that the first fingerprint information does not match the pre-stored fingerprint information, in order to protect the user's information security, the smart watch will not perform any operation and continue to detect a sliding operation on any functional region and acquire the sliding information of the sliding operation.

The method provided by the embodiment of the disclosure, in the situation that the bezel design is canceled, performs a corresponding operation according to a touch operation detected on the functional region, thus reducing the size of the smart watch and improving the comfort and flexibility during wearing.

Figure 7:
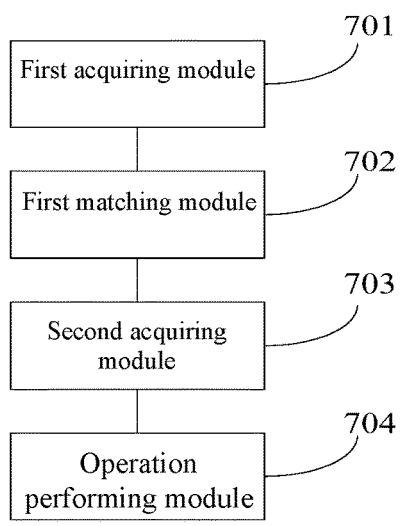
FIG. 7 is a structural schematic view of the operation control apparatus according to another embodiment of the present disclosure.

Referring to FIG. 7, an embodiment of the present disclosure provides an operation control apparatus, comprising:

a first acquiring module 701 configured to, when a sliding operation is detected on any functional region, acquire sliding information of the sliding operation, the sliding operation comprising at least first fingerprint information and a sliding direction;

a first matching module 702 configured to match the first fingerprint information with pre-stored fingerprint information;

a second acquiring module 703 configured to acquire a current state of the smart watch if the first fingerprint information matches the pre-stored fingerprint information, the state including a power-on state, a standby state and a power-off state;

an operation performing module 704 configured to perform a corresponding operation according to the current state and the sliding direction.

In another embodiment of the present disclosure, the first acquiring module 701 is configured to continue to acquire sliding information of the sliding operation when the first fingerprint information does not match the pre-stored fingerprint information.

In another embodiment of the present disclosure, the operation performing module 704 is configured to perform the power-off operation when the current state is the power-on state and the sliding direction is a first direction; and to perform a power-on operation when the current state is the power-off state and the sliding direction is a second direction.

In another embodiment of the disclosure, the apparatus further comprises:

a receiving module configured to receive a message pushed by a smart terminal;

a third acquiring module configured to, when a touch operation is acquired on any functional region, acquire second fingerprint information of the touch operation;

a second matching module configured to match the second fingerprint information with the pre-stored fingerprint information;

a first display module configured to display the contents of the message on the display screen if the second fingerprint information matches the pre-stored fingerprint information.

In another embodiment of the disclosure, the apparatus further comprises:

a connection module configured to establish a connection with the smart terminal.

In another embodiment of the disclosure, the apparatus further comprises:

a first switching module configured to switch the current state from the power-on state to the standby state if a touch operation is not detected or information pushed by a smart terminal is not received in the power on state within a preset time period;

a second display module configured to display the current time on the display screen.

In another embodiment of the disclosure, the apparatus further comprises:

a second switching module configured to switch the current state from the standby state to the power-on state when a touch operation is detected on the display screen.

In summary, in the situation that the bezel design is canceled, the apparatus provided by embodiments of the present disclosure performs a corresponding operation according to a touch operation detected on a functional region, thus reducing the size of the smart watch and improving the comfort and flexibility during wearing.

It is to be noted that the smart watch and the operation control apparatus therefor provided by the above-described embodiments are only described when the operation control is performed with the division of the functional modules described above as an example. In actual applications, the functions may be assigned to and performed by different functions modules, that is, the internal structure of the smart watch and the operation control apparatus therefor may be divided into different functional modules to perform all or a part of the functions described above. In addition, the smart watch and the operation control apparatus therefor belong to the same inventive concept as the operation control method therefor provided in the embodiments described above, and thus the detailed description thereof are omitted.

It will be appreciated by those of ordinary skill in the art that all or part of the steps of implementing the embodiments described above may be accomplished by hardware, or may also be accomplished by programs instructing related hardware. The programs may be stored in a computer-readable storage medium, which may be a read-only memory, a magnetic disk, an optical disk, or the like.

The foregoing is only exemplary embodiments of the present disclosure and is not intended to limit the present disclosure, and any modifications, equivalent substitutions, improvements and the like within the spirit and principles of the present disclosure are intended to be encompassed by the protection scope of the present disclosure.

The invention claimed is:

1. A smart watch, comprising:
a watch body, the watch body comprising a display screen and a system board, the system board comprising at least a microprocessor, a memory and a communication module;
a watchband configured to fix the watch body on a user's wrist;
a biosensor integrated on a surface of the watchband configured to contact the user's wrist; and
a metal ring disposed around the watch body and protruding above an upper surface of the watch body, the metal ring configured to fix and protect the watch body;
wherein an outer wall of the metal ring includes two functional regions, each functional region includes a fingerprint identification sensor and a fingerprint identification module, the fingerprint sensor is disposed on a surface of the corresponding functional region, and the fingerprint identification module is disposed inside the corresponding functional region.

2. The smart watch according to claim 1, wherein the watch body further comprises a plurality of sensors, which include at least a gravitational accelerometer and a gyroscope.

3. The smart watch according to claim 1, wherein the display screen comprises at least one of a liquid crystal display (LCD), an organic light emitting diode (OLED), and an electronic ink (E-ink).

4. The smart watch according to claim 1, wherein the system board further comprises a power management module.

5. The smart watch according to claim 1, wherein the two functional regions are concave from a surface of the metal ring.

6. The smart watch according to claim 1, wherein each functional region further includes an energy storage module.

7. The smart watch according to claim 1, wherein the communication module comprises one of a Bluetooth module, a wireless fidelity (WiFi) module, an infrared module, and a near field communication (NFC) module.

8. The smart watch according to claim 1, wherein the watch body is electrically connected with the watchband.

9. A method of controlling operation of the smart watch according to claim 1, the method comprising:
when a sliding operation is detected on any functional region of the smart watch, acquiring sliding information of the sliding operation, the sliding information comprising at least first fingerprint information and a sliding direction;
matching the first fingerprint information with pre-stored fingerprint information;
when the first fingerprint information matches the pre-stored fingerprint information, acquiring a current state of the smart watch, the current state including one of a power-on state, a standby state and a power-off state; and
performing a corresponding operation according to the current state and the sliding direction.

10. The method according to claim 9, further comprising:
when the first fingerprint information does not match the pre-stored fingerprint information, continuing with acquiring sliding information of the sliding operation.

11. The method according to claim 9, wherein performing a corresponding operation according to the current state and the sliding direction comprises:
performing a power-off operation when the current state is the power-on state and the sliding direction is a first direction;
performing a power-on operation when the current state is the power-off state and the sliding direction is a second direction.

12. The method according to claim 9, further comprising:
receiving a message pushed by a smart terminal;
when a touch operation is acquired on any functional region of the smart watch, acquiring second fingerprint information of the touch operation;
matching the second fingerprint information with the pre-stored fingerprint information; and
when the second fingerprint information matches the pre-stored fingerprint information, displaying contents of the message on a display screen.

13. The method of claim 12, wherein prior to receiving the message pushed by the smart terminal, the method further comprises:

establishing a connection with the smart terminal.

14. The method according to claim 9, further comprising:

when a touch operation is not detected or information pushed by a smart terminal is not received within a preset period in the power-on state, switching the current state from the power-on state to the standby state and displaying a current time on a display screen.

15. The method according to claim 14, wherein, after switching the current state from the power-on state to the standby state, the method further comprises:

switching the current state from the standby state to the power-on state when a touch operation is detected on the display screen.

16. An operation control apparatus for the smart watch according to claim 1, the operation control apparatus comprising:

a first acquiring module configured to, when a sliding operation is detected on any functional region of the smart watch, acquire sliding information of the sliding operation, the sliding information comprising at least first fingerprint information and a sliding direction;

a first matching module configured to match first fingerprint information with pre-stored fingerprint information;

a second acquiring module configured to acquire a current state of the smart watch when the first fingerprint information matches the pre-stored fingerprint information, the current state including one of a power-on state, a standby state and a power-off state; and an operation performing module configured to perform a corresponding operation according to the current state and the sliding direction.

17. The apparatus according to claim 16, wherein the operation performing module is configured to perform a power-off operation when the current state is the power-on state and the sliding direction is a first direction, and to perform a power-on operation when the current state is the power-off state and the sliding direction is a second direction.

* * * * *